United States Patent [19]

Matz

[11] 4,375,997

[45] Mar. 8, 1983

[54] METHOD OF INDUCTIVELY HEAT TREATING A THIN-WALLED WORKPIECE TO CONTROL DISTORTION

[75] Inventor: Donald L. Matz, Saginaw, Mich.

[73] Assignee: General Motors Corporation, Detroit, Mich.

[21] Appl. No.: 378,012

[22] Filed: May 13, 1982

[51] Int. Cl.³ .............................................. C21D 1/10
[52] U.S. Cl. .................................... 148/150; 148/152; 148/154; 148/145; 266/103; 266/129; 219/10.41; 219/10.43
[58] Field of Search ............... 148/150, 152, 154, 145; 266/103, 129; 219/10.41, 10.43, 10.57, 10.59, 10.73

[56] References Cited

U.S. PATENT DOCUMENTS

| | | | |
|---|---|---|---|
| 2,295,272 | 9/1942 | Somes | 148/145 |
| 2,547,053 | 4/1951 | Somes et al. | 148/150 |
| 2,752,470 | 6/1956 | Redmond et al. | 219/10.43 |

*Primary Examiner*—L. Dewayne Rutledge
*Assistant Examiner*—R. McDowell
*Attorney, Agent, or Firm*—George A. Grove

[57] ABSTRACT

In a preferred embodiment a surface layer of a thin-walled, hollow, cylindrical steel body is hardened while controlling thermal distortion by first heating with an inductor and quenching in one direction over the surface and then repeating the process in the reverse direction.

5 Claims, 3 Drawing Figures

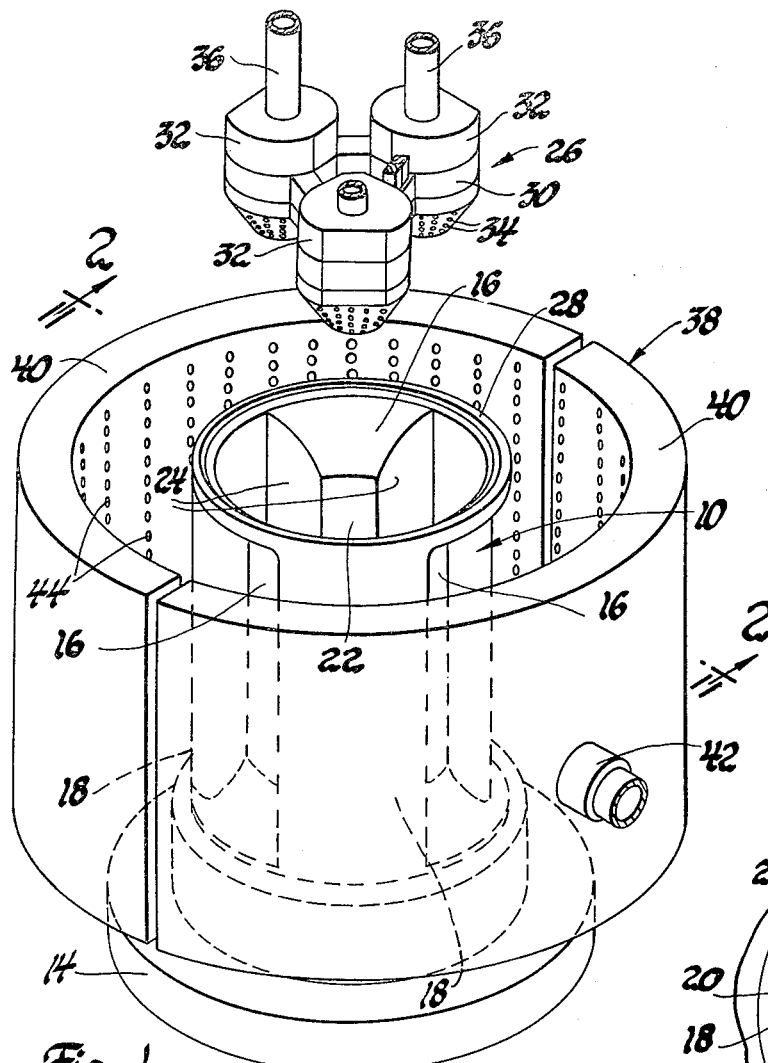
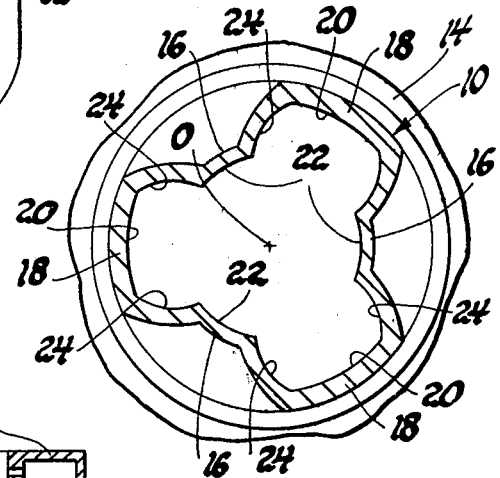
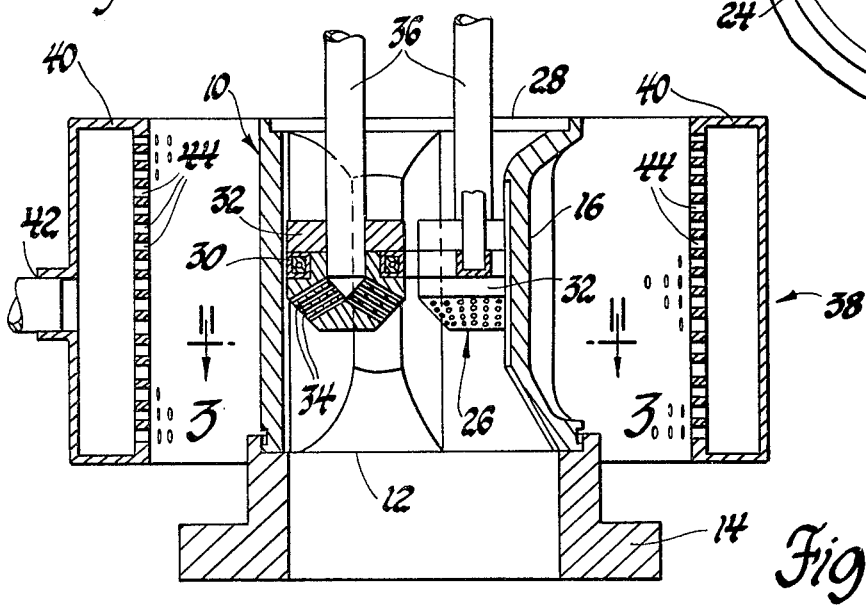
Fig. 1
Fig. 3
Fig. 2

METHOD OF INDUCTIVELY HEAT TREATING A THIN-WALLED WORKPIECE TO CONTROL DISTORTION

This invention relates to the inductive heat treatment of thin-walled workpieces to produce selected hardened surfaces while minimizing unwanted thermal distortion of the workpiece. More specifically, this invention relates to such heat treatment of workpieces having varied or irregular profile thin walls to efficiently provide a hardened surface layer without causing excessive thermal distortion of the part.

It is sometimes necessary to harden a surface layer of a relatively thin (e.g., 5 to 10 mm) steel part. Often such parts are shaped like hollow cylinders. Relatively shallow hardened layers can be produced by carburizing and hardening in a furnace operation. A deeper case depth can be obtained by forming the part of a suitably hardenable steel and employing induction heating with quenching.

It has been possible to use induction heating on those workpieces (particularly cylindrical pieces) that have a constant, e.g., circular, surface profile. The generally accepted practice is to inductively heat the workpiece by an outside or inside diameter single-turn encircling induction coil, which is advanced slowly along the length of the profile to be hardened. The portions of the surface adjacent the moving coil are progressively heated in a single pass above the austenitic transformation temperature of the steel. A quenching unit directly behind or below the inductor progressively quench hardens the previously heated portions of the workpiece. The workpiece usually is rotated as it is scanned past the inductor coil. Since the workpiece can be rotated, centering the inductor coil and workpiece is not critical. Rotation evens out the case depth pattern obtained. Various case depths can be obtained by varying any or all of the following: power level, frequency, scan speed, quench media and concentration, and inductor coil design.

A tripot universal joint is an automobile component that has a generally cylindrical, hollow, thin-walled, hardenable steel housing. The housing body has three equispaced indentations around its circumference that form three internal drive tracks for a three-roller inner drive member of the joint. It is necessary to harden the walls of the tracks. However, it has proven very difficult to induction harden such irregular or varied profiles. The part cannot be rotated with respect to the inductor. Moreover, the progressive heating with quenching causes an increasing amount of distortion in the workpiece in the direction of advance of the inductor. Various methods have been used to avoid or correct such distortion in the workpieces of varying profile, such as the tripot housing. The parts have been made larger in the critical areas for strengthening to reduce the distortion. Clamp and fixtures have been used to reduce or correct the distortion. The parts have been machined to compensate for or correct the hardening distortion. All of these approaches add costs and sometimes weight. It would be preferable to avoid or correct the distortion by control of the hardening process.

Accordingly, it is an object of the present invention to provide a relatively simple and efficient method of induction heat treating a surface of a thin-walled (for example, 5 to 10 mm thick) workpiece (or one having a thin wall portion) while concurrently controlling the thermal distortion normally produced by induction hardening.

It is a more specific object of the present invention to provide a method of induction hardening an inside or outside surface of a hollow, thin-walled, generally circular steel workpiece while concurrently controlling or eliminating thermal distortion of the part. It is another object of my invention to provide such a hardening method that is applicable to such workpieces where the surface to be hardened has an irregular profile.

It is a still further object of my invention to provide a method of producing substantially distortion-free tripot universal joint housings having selectively heat treated internal surfaces.

In accordance with a preferred practice of my invention, these and other objects are accomplished as follow with respect to the hardening of the side walls of the three internal drive tracks of a tripot housing. A generally cloverleaf-shaped copper inductor is moved progressively through the interior of the housing from one end to the other in close proximity to the lobe surfaces to be hardened. In conventional practice the inductor is inserted one way through the housing in a nonheating mode. Then as the inductor is withdrawn from the housing, it is electrically activated to progressively heat a surface layer along the interior of the body. Simultaneously, cooling water or other suitable quenching fluid is applied to the body to form the hard steel microstructure. This progressive heating of the interior surfaces introduces gradually increasing thermal distortion of the part in the direction of advance of the inductor which is very difficult to prevent. I have made the surprising discovery that suitable interior surface hardening can be produced and thermal distortion eliminated to the extent desired by causing the inductor coil to be activated during both directions of its travel. As the coil is being passed in the first direction through the open-ended housing, it progressively heats the adjacent interior surfaces. They are simultaneously cooled, at least from the outside of the body, so that they are hardened. The body is thermally distorted, with the degree of distortion increasing in the direction the inductor is advancing. Substantially immediately the inductor, still activated, is moved in the reverse direction over all, or substantially all of the surface originally heated. By heating, with concurrent quenching, in the reverse direction the thermal distortion produced during the first passage of the coil can be undone. Thus, by heating with cooling during both passes of the inductor a hardened workpiece may be produced in accordance with my method in which thermal distortion is eliminated or controlled to a predetermined desired amount.

These and other objects of my invention will become more apparent to one skilled in the art from a detailed description thereof which follows. Reference will be made to the drawings, in which:

FIG. 1 depicts an assembly for carrying out my invention—the assembly comprising a tripot housing supported on one end, a surrounding water quench apparatus, and an inductor member positioned above the open end of the housing prior to commencement of the heat treatment cycle;

FIG. 2 is a sectional view of the assembly of FIG. 1 taken at plane 2—2 of FIG. 1, with the inductor partially inserted in the workpiece; and FIG. 3 is a sectional view of the housing as positioned in FIG. 2 at plane 3—3 of FIG. 2.

A tripot universal joint housing member is a unitary, hollow, relatively thin-walled steel member of generally cylindrical structure. It can be formed by cold-forming from commercially available steel tube stock. A suitable method is described in copending application Ser. No. 232,905, filed Feb. 9, 1981, and assigned to the assignee of this invention. The housing is indented at three equally spaced positions on its periphery and between the ends of the cylinder to form three lobes. The lobes define internal drive tracks for the complementary drive member of the joint—a three-roller drive member. The side walls of each track are concentric, cylindrical surfaces. The center axes of the tracks are symmetrically disposed about the central axis of the housing. It is desired to harden the side walls of the tracks. The thickness of the housing wall is nominally about 8 mm. My method provides a way of induction hardening and quenching the side walls of the tracks while closely controlling the thermal distortion of the workpiece.

Referring to the three figures of the drawing, a tripot housing 10 is shown standing upright on one end 12 on a complementary workpiece support member 14. The housing 10 is a unitary piece, having three indentations 16 between three symmetrically located lobes 18 spaced at about 120° of arc about the longitudinal axis 0 of the housing. The lobes define internal tracks 20 which merge into a central cylindrical bore partially defined by surfaces 22. Side walls 24 of the three tracks 20 are to be hardened to provide wear resistance for the reason stated above.

A cloverleaf-shaped induction heating coil assembly 26 is employed to progressively heat the side walls 24 of the tracks 20. The assembly 26 is suitably supported (by means not shown) directly above upper end 28 of housing 10, and it is movable at a controllable rate along a vertical axis down into and back up out of the housing. The assembly 26 comprises a hollow (for water cooling), cloverleaf-shaped copper inductor 30. Fixed within each of the three loops of the inductor coil 30 is a complementary-shaped Ferro-Con ferromagnetic flux concentrator 32 that extends above and below the inductor 30. The generally cylindrical Ferro-Con bodies 32 and surrounding copper inductor 30 loops conform closely to side walls 24 of the housing internal tracks 20 to be hardened. The lower portion of the Ferro-Con bodies are provided with drilled water passages 34 to direct an internal quenching liquid to the heated surface, as will be described. Tubes 36 carrying water to the hollow Ferro-Con bodies 32 are sealingly engaged therewith. Thus, in its operative mode, the inductor assembly 26 has a water-cooled, hollow copper coil 30 defining three loops adapted to carry a high frequency, high power electrical current for inductively heating the selected surfaces of the workpiece. The hollow Ferro-Con bodies provide means for concentrating the magnetic field produced by the inductor and for spraying water on the heated surface from below the coil.

Situated around the outside surface of the workpiece tripot housing is an O.D. quench body 38. This assembly comprises two semicircular annular bodies 40 supplied with cooling water at ports 42, which in turn is sprayed against the outside of the housing through a large number of spray holes 44.

In accordance with prior art concepts of induction hardening a hollow workpiece, such as the tripot housing depicted in the drawings, the following practice would have been followed. No external quence would have been used. The inductor assembly in an unactivated condition would have been moved down to or past the bottom opening of the housing. A high frequency alternating electrical current would then have been passed through the inductor and the water spray turned on. As the apparatus was raised from the lower end to the upper end of the workpiece, the coil would have progressively heated closely adjacent elements or bands of the workpiece surface above the autenitic transformation temperature. Immediately following the passage of the inductor heater, the water spray would have quenched the austenitized surface to a hard martensitic structure. However, each stepwise heated element of the surface expands and is trapped in its expanded condition by the immediately following quenching operation. The distortion thereby introduced becomes progressively greater so that the internal dimensions of the heat treated portions of the housing are significantly smaller at the top of the housing (as shown) than at the bottom.

In accordance with my invention a distortion-free workpiece or one with a controllable, desirable amount of distortion is produced as follows. The workpiece 10 is continually cooled on its outer surface by the outside quenching apparatus 38. The inductor assembly is slowly lowered into the upper opening of the workpiece. Inductor coil 30 surfaces pass in close proximity to workpiece surfaces 24 that are intended to be hardened. When the descending coil reaches a surface area to be hardened, it is activated. Cooling water will be flowing through the inductor coil at this time, but it is not necessary that the internal surface of the workpiece be quenched. Thus, selected surface regions of the inside of the housing are progressively rapidly heated to a desired depth to a temperature above the austenitic transformation temperature of the steel. Obviously, the steel employed for the workpiece should be a hardenable steel, such as an SAE 1050 steel modified to contain manganese in an amount of 0.8 to 1.1%. Since the thin-walled workpiece is only about 8 mm thick, the outside quench is sufficient to both strengthen the outside portion of the workpiece and harden the austenitized internal surfaces. The combined effect of the progressive heating by the descending coil and the concurrent O.D. quench is to produce a hardened, but increasingly greater distorted internal surface on the workpiece.

In accordance with the practice of my method, the inductor assembly is substantially immediately moved back up the workpiece. However, contrary to conventional wisdom, it is still in its heating mode. Unlike previous practices, the surfaces previously hardened are again heated up the same inductor assembly. The position of the inductor assembly and the workpiece are not changed, except for the raising of the inductor. During the ascent of the inductor assembly the internal quench is also turned on. The rate of ascent of the inductor assembly, the power input and the rates of internal and external cooling are adjusted to harden again the internal surfaces of the workpiece. However, the effect of this apparently superfluous rehardening during the reverse sweep of the inductor is, surprisingly, to eliminate the distortion previously introduced and to leave the workpiece with substantially uniform, internal dimensions throughout the length of the workpiece.

A specific example will further illustrate the practice of my invention. The axial length of a tripot housing workpiece was about 90 mm. A complementary cloverleaf-shaped coil assembly was lowered into the housing, as described above, at a rate of about 13 mm per second.

The inductor was activated with alternating current at a power of about 150 kw and a frequency of 10,000 Hz. The coil was activated when the inductor reached a depth of about 30 mm in the housing, and shut off when it reached a depth of about 85 mm. The descent of the coil continued below the bottom end of the housing. After a dwell of about 2 to 3 seconds, the coil assembly was raised at a rate of 13 mm per second. When the coil was activated it was at the same power and frequency. The coil was activated from a level of about 85 mm up to a level of about 5 mm from the top of the housing. The reason for treating the surface above that treated during the first pass will be explained below. The outside water spray was turned on during both passes of the inductor. The internal spray was also turned on during the ascent of the inductor through the housing.

After the housing was removed from the supporting fixture, the dimensions across each of the three internal tracks 20 (see arrow in FIG. 3) were found to remain substantially constant throughout the length of each of the tracks that were heated during both passes. There was substantially no uncontrolled distortion in the product induction hardened by the subject process. In contrast, when a like housing workpiece was inductively heated and quench hardened in a single pass in accordance with prior art practices, a difference in dimension of over 6 thousandths of an inch was observed from one end of the housing to the other. Such difference exceeded that variance acceptable in a single step in the manufacture of the housing member.

The subject method is applicable in the induction and quench hardening of either the internal or the external surface of a hollow, thin-walled, cylindrical body. The hardening is accomplished while the thermal distortion of the part can be controlled in a desired manner or eliminated. Either the internal or external surface of the workpiece is heated in both directions of scan of the inductor body, and at least the opposite surface is simultaneously quenched. The heated surface may also be quenched following the passage of the inductor body. My method has particular application where the surface to be heat treated is of varying profile, such as the case with the tripot housing. In this situation the workpiece and inductor member cannot be rotated with respect to each other to average out differences in inductor-workpiece spacing, flux concentration and the like. My method overcomes the tendency to distort the workpiece arising from unequal heating in different parts of the workpiece. By promptly scanning back and forth over the workpiece with the activated inductor while cooling the workpiece, the thermal distortion introduced in the first passage is reversed during the reverse passage.

My method offers a further unexpected benefit. Sometimes a hardened workpiece is to be subjected to a further manufacturing operation, such as welding or other thermal processing which would distort the workpiece. In this situation the reverse scan of the inductor in accordance with my process may be controlled to leave a certain amount of distortion in the workpiece which will be counteracted or removed by the subsequent welding operation. This was provided for in the above example. Heating during the raising of the inductor was continued above the region heated during the first pass of the inductor. The once-treated area of the housing (from the 5 mm down to the 30 mm level from end 28) was slightly distorted inwardly. A subsequent spin welding operation to affix a closure member to end 28 of the housing enlarged that end of the housing to remove the intentionally induced distortion.

The thickness of the layer heat treated during the scan of an inductor depends on such variables as the electrical power carried by the inductor, the rate at which the inductor is moved over the surface, the proximity of the inductor to the surface, and the intensity of cooling on the opposite surface. By so controlling the heating effect, my process may be used to heat treat articles having varying wall thicknesses. I have described the use of my process as applied to a workpiece having thin walls of uniform thickness but of irregular profile. However, this process can also be applied to workpieces having tapered thin-walled sections and to workpieces having both thin-walled sections and thick-walled sections. For example, in hollow cylindrical workpieces having portions that vary markedly in thickness stepwise, the thin-walled portions can be hardened as described herein during both passes of the inductor so as to harden the surface and remove or control the distortion. Thick-walled portions of the body may be heated only during one pass of the inductor to provide a hardened surface layer. Reliance can be had on the greater strength of the thick-walled portion to minimize its distortion.

In accordance with my process, distortion in a thin wall containing workpiece can also be affected or controlled by forming a deeper case during the scan in one direction than during the scan in the opposite direction. Distortion can be affected by hardening only selected bands or regions during one or both of the passes of the inductor over the workpiece.

Thus, my process can be varied and used to eliminate or control distortion during the induction hardening of a wide variety of workpiece configurations having thin-walled sections. The process is particularly useful for hardening the interior or exterior surface of hollow, generally cylindrical workpieces.

While my invention has been described in terms of certain preferred embodiments thereof, it will be appreciated that other forms of my hardening process could readily be adapted by those skilled in the art. Accordingly, the scope of my invention is to be considered limited only by the following claims.

The embodiments of the invention in which an exclusive property or privilege is claimed are defined as follows:

1. A method of induction heating and quench hardening a surface layer of a thin walled, hollow, cylindrical, hardenable steel body while controlling thermal distortion of the body, comprising passing an inductor member along the body in close proximity to the internal or external surface layer that is to be hardened, the inductor being activated when passing over the selected surface to progressively heat shallow elements of the layer above the austenitic transformation temperature until the surface layer has been so heated, simultaneously cooling the body with a fluid quenchant at least from the opposite side to harden the heated element, the said progressive heating with cooling producing a dimensional distortion in the treated surface of the part that increases in the direction of passage of the inductor, substantially immediately reversing the direction of passage of the inductor and activating the inductor to progressively heat, with continued cooling, over the same surface from the opposite direction so as to leave the surface in a hardened condition and to undo to a desired extent distortion introduced in the preceding step.

2. A method of induction hardening a selected interior surface layer of an open-ended, thin-walled, hollow, hardenable steel body so as to control thermal distortion of the body, comprising passing an inductor in an axial direction from one end of the body to the other in close proximity to the surface layer, the inductor being activated when passing over the selected surface region to progressively heat shallow elements of the layer above the austenitic transformation temperature until all of the surface layer has been so heated, simultaneously cooling the body at least from the outside to harden the heated elements, the said progressive heating with cooling producing a dimensional distortion in the part that increases in the direction of passage of the inductor, and substantially immediately reversing the direction of passage of the inductor and activating it to progressively heat, with continued cooling, over the same surface from the opposite direction so as to leave the surface in a hardened condition and to undo to a desired extent thermal distortion introduced in the preceding step.

3. A method of induction hardening selected interior surface portions of an open-ended, hardenable steel tripot universal joint housing member to control the thermal distortion of the housing, comprising passing a trilobe inductor in an axial direction through the housing in a direction from one end to the other in close proximity to the corresponding lobe surfaces of the housing, the inductor being electrically activated when passing over the regions to be heated to progressively heat shallow elements of the surface layers above the austenitic transformation temperature until the desired surfaces have been so heated one time, simultaneously quenching the housing from the outside to harden the heated elements, the said progressive heating with cooling producing a thermal distortion in the part that increases in the direction of movement of the inductor, and substantially immediately reversing the direction of the passage of the inductor and activating it to progressively heat, with continued cooling, over the same surface portions from the opposite direction at a rate so as to leave the surfaces in a hardened condition while undoing to a desired extent thermal distortion introduced in the first heating step.

4. A method of induction heating and quench hardening a surface layer of a thin-walled portion of a hardenable steel body while controlling thermal distortion of the body, comprising passing an inductor member along the body in close proximity to the surface layer of the thin-walled portion that is to be hardened, the inductor being activated when passing over the selected surface to progressively heat shallow elements of the layer above the austenitic transformation temperature until at least a portion of the surface layer has been so heated, simultaneously cooling the body with a fluid quenchant at least from the opposite side to harden the heated elements, the said progressive heating with cooling producing a dimensional distortion in the treated surface of the part that increases in the direction of passage of the inductor, substantially immediately reversing the direction of passage of the inductor and activating the inductor to progressively heat, with continued cooling, at least a portion of the same surface from the opposite direction so as to leave the surface of the thin-walled portion in a hardened condition and to undo to a desired extent distortion introduced in the preceding step.

5. A method for induction heating and quench hardening a surface layer of a thin-walled portion of a hollow, cylindrical, hardenable steel body while controlling thermal distortion of the body, comprising passing an inductor member along the body in close proximity to the internal or external surface layer of the thin-walled portion that is to be hardened, the inductor being activated to progressively heat shallow elements of the layer above the austenitic transformation temperature until at least a portion of the surface layer has been so heated, simultaneously cooling the body with a fluid quenchant at least from the opposite side to harden the heated elements, the said progressive heating with cooling producing a dimensional distortion in the treated surface of the part that increases in the direction of passage of the inductor, substantially immediately reversing the direction of passage of the inductor and activating the inductor to progressively heat, with continued cooling, at least a portion of the same surface from the opposite direction so as to leave the surface of the thin-walled portion in a hardened condition and to undo to a desired extent distortion introduced in the preceding step.

* * * * *

UNITED STATES PATENT AND TRADEMARK OFFICE
CERTIFICATE OF CORRECTION

PATENT NO. : 4,375,997
DATED : March 8, 1983
INVENTOR(S) : Donald L. Matz

It is certified that error appears in the above-identified patent and that said Letters Patent are hereby corrected as shown below:

Column 3, line 40, "Ferro-Con" should read -- Ferro-Tron --;
            line 42, "Ferro-Con" should read -- Ferro-Tron --;
            line 45, "Ferro-Con" should read -- Ferro-Tron --;
            line 49, "Ferro-Con" should read -- Ferro-Tron --;
            line 55, "Ferro-Con" should read -- Ferro-Tron --;
            line 67, "quence" should read -- quench --.
Column 4, line 51, "up" should read -- by --.

Signed and Sealed this

Thirty-first Day of May 1983

[SEAL]

Attest:

DONALD J. QUIGG

Attesting Officer     Acting Commissioner of Patents and Trademarks